Jan. 11, 1944.    J. A. LIGNIAN    2,338,858
METHOD OF FORMING BEARINGS
Filed Aug. 27, 1940    2 Sheets-Sheet 1

INVENTOR
Jean A. Lignian
BY
ATTORNEYS

Jan. 11, 1944.    J. A. LIGNIAN    2,338,858
METHOD OF FORMING BEARINGS
Filed Aug. 27, 1940    2 Sheets-Sheet 2

INVENTOR
Jean A. Lignian
BY
ATTORNEYS

Patented Jan. 11, 1944

2,338,858

UNITED STATES PATENT OFFICE 2,338,858

METHOD OF FORMING BEARINGS

Jean A. Lignian, Dayton, Ohio, assignor to General Motors Corporation, Detroit, Mich., a corporation of Delaware Application August 27, 1940, Serial No. 354,419

5 Claims. (Cl. 29—149.5)

This invention relates to an improved method of forming bearings of the composite type.

It is an object of the invention to provide a method of forming composite bearings wherein the thickness of the bearing back which is usually a steel, or the like, is substantially uniform after the bearing has been formed. In carrying out the above object it is a further object, when operating on a composite bearing comprising a sintered metal layer bonded to a steel back, to provide a method whereby the thickness of the sintered metal layer is substantially uniform throughout the bearing after formation thereof.

Another object of the invention is to provide a method whereby the metal crowded at the ends of the bearing during the formation step and flows outwardly at the ends thereof for increasing the thickness of the bearing at the end portions to substantially the same thickness as the remainder of the bearing.

In carrying out the above objects it is a further object of the invention to taper the stock of the blank at the end portions thereof so that when the metal is thickened during formation of the bearing, that the thickness becomes substantially uniform throughout the entire bearing.

Further objects and advantages of the present invention will be apparent from the following description, reference being had to the accompanying drawings wherein a preferred embodiment of the present invention is clearly shown.

Recent trends in the manufacture of bearings which include a soft bearing metal attached to a strong supporting back have been toward a diminution in thickness of the soft bearing layer. In the newer type of bearings the soft metal layer is sometimes as thin as two to three thousandths of an inch and in most cases does not exceed .005 to .007 inch. In bearings of this type upon formation thereof from composite strip stock there is an apparent thickening at the ends of the bearing due to the crowding of the metal during formation. This thickening in the backing member causes considerable difficulty during the finish machining of the bearing, since as the bearing is line-bored or otherwise machined to cause the bearing metal layer to assume a thickness of for example .003" the bearing metal at the end portions of the bearing which are at the parting line in a complete assembly is very thin due to the thickening of the supporting stock. In some cases when machining bearing metal to .002" at the center portion thereof it is possible to machine off all of the soft metal at the end portions of the bearing due to this thickening effect.

In the past, this difficulty was not apparent since the bearing metal layers were of considerable thickness ranging from .010 to .050" and upwards and therefore the thickening of the stock supporting the soft metal layer was of little moment.

I have discovered that it is possible to obtain a uniform thickness bearing metal layer by prior preparation of the supporting metal strip material whereby the material is formed or machined to a shape which permits formation of the metal of the bearing without thickening the stock at the edges beyond the original thickness thereof. The expedient utilized comprehends the tapering off of stock adjacent the edges of the supporting strip so that when the metal swaged at the ends of the bearing the tapered portions thereof thickens back to the original thickness of the stock prior to the tapering thereof. In this manner, bearings may be formed and later machined and include a soft metal bearing layer of uniform thickness throughout even if the thickness is in the order of .002".

In order to accomplish the tapering operation in the most economical manner I propose to operate on the steel, copper, nickel or other hard supporting metal members to taper the stock during the rolling thereof, that is the tapering at the edges of the stock will be accomplished on long lengths of stock wherein the width of the stock represents the developed length of the bearing blank. Thus when the stock is cut transversely thereof into blanks, the formation of the bearings presents a simple forming operation which may be easily accomplished. It is apparent that while the method disclosed is economically the best method that operations may be performed on individual blanks to accomplish the same end.

Figure 1:
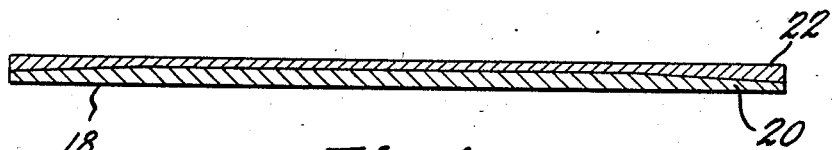
Fig. 1 shows a bearing blank in a flat condition.
Figure 2:
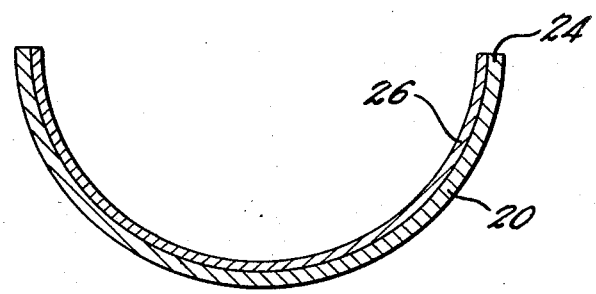
Fig. 2 shows the blank of Fig. 1 in the formed and machined condition.

Bearing manufacture is usually performed by continuous operations wherein the stock is continuously babbitted in long lengths and cut off transversely thereof into blanks. In this manner when making composite bearings including a steel supporting back, or the like, with a soft metal bearing layer such as babbitt thereon I propose to obtain the stock from the mill having tapered edges which stock is run thru the babbitting operation. A cross section of such stock 18 is shown in Fig. 1 wherein 20 indicates the steel and 22 the babbitt. After blanking, the bearing blanks have the desired thickness and final formation is accomplished preferably by the method described hereinafter. The formed bearing, in cross section, will appear as shown in Fig. 2 which shows the bearing after machining of the babbitt. It will be noted at 24 that the steel is substantially of the same thickness due to the thickening effect during formation. Thus when the babbitt is machined a layer 26 of uniform thickness is provided.

Another bearing of the composite type which is well adapted to the present method is disclosed in Patent 2,198,240 assigned to the assignee of the present invention. This bearing includes a steel back which has bonded thereto a layer of highly porous metal usually a bronze, or a copper nickel alloy or the like. This porous metal layer, or matrix as it may be termed, is then impregnated with a soft bearing metal which fills the pores of the matrix and which overlies the matrix a substantial thickness. The matrix provides a mechanical lock for the soft bearing metal thereby preventing bond failure between the metal and the back. The bearing metal is machined off so that the thickness thereof is approximately .002 to .003" above the top of the matrix layer. It has been found that when forming these bearings that a similar thickening at the end portions is apparent which thickening is present in both the steel and the matrix layer.

Figure 3:
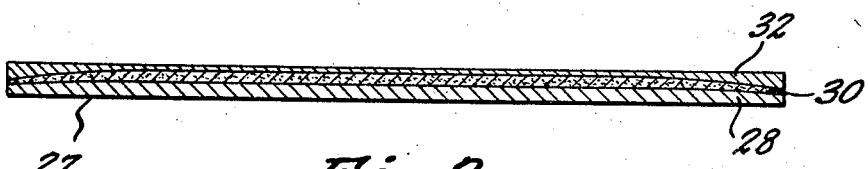
Fig. 3 shows the bearing blank in the flat which includes the porous metal layer thereon and which is impregnated with soft bearing metal.
Figure 4:
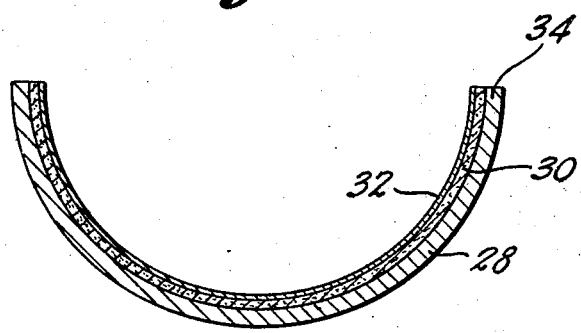
Fig. 4 is a view of the blank in Fig. 3 after formation and machining of the bearing.

When alloying the invention disclosed herein to bearings of this type I propose to roll the matrix layer which is commonly termed sizing thereof so that the thickness is substantially uniform thru the center portion of the strip and then tapers off adjacent the edges thereof. A cross section of strip formed in this manner is shown in Fig. 3, wherein 28 designates the steel, 30 the matrix layer and 32 the impregnated babbitt overlay which is applied after the sizing operation. It will be noted that the steel is tapered off slightly due to the sizing and that the sintered metal matrix layer is tapered off considerably. Bearings of this type are made by continuous methods and therefore it is apparent that the operation defined may be accomplished continuously, or if desired, on individual blanks. Blanks 27 of the type shown in Fig. 3 after formation appears as the cross-section shown in Fig. 4 wherein the solid metal back 28 has thickened up at 34 as has the sintered metal layer 30. Thus the thickness of the sintered metal layer plus the steel backing is substantially constant thruout the entire bearing. In this manner it is possible to machine the babbitt so the overlay is of substantially constant thickness.

It is apparent that the formation of bearings by this method may be utilized either in continuous processes or may be equally well resorted to when operating on single bearing blanks, the entire essence thereof being providing bearing blanks wherein the supporting metal portions thereof are tapered sufficiently to permit the metal during formation to flow to the tapered portions thereof thereby increasing the thickness to substantially the same thickness of the remainder of the bearing.

Figure 5:
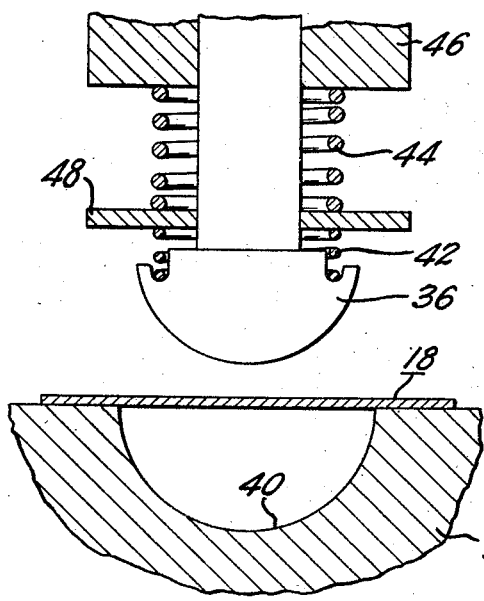
Figs. 5 through 8 are perspective views of apparatus used to form bearing blanks in an arcuate shape and simultaneously thicken the stock adjacent the end portions thereof.

In forming the blanks 18 into arcuate bearings such as is shown in Fig. 2, I prefer to use a forming mechanism having a spring loaded plunger therein as designated at 36, in Fig. 5. In this instance, the forming apparatus includes the plunger 36 and a die 38 which has an arcuate cavity 40 therein. The plunger 36 is loaded by means of springs 42 and 44 and is slidably guided in a block 46.

Figure 6:
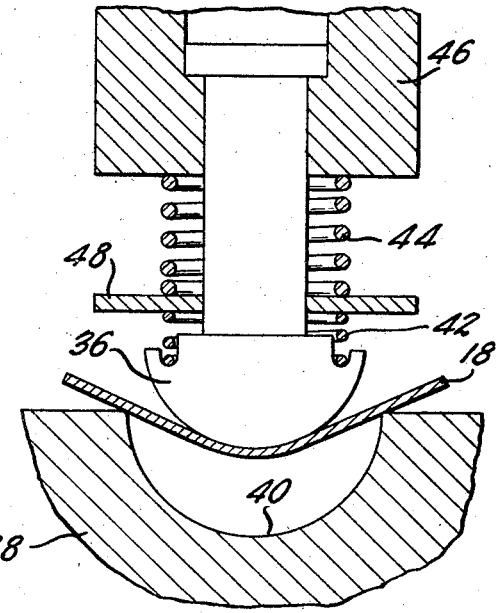
Figure 7:
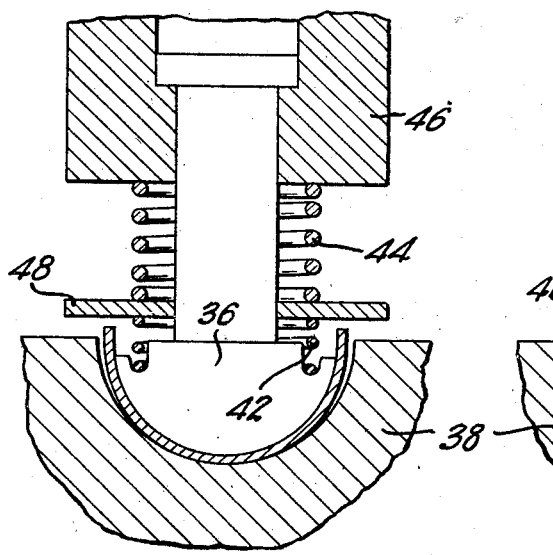
Figure 8:
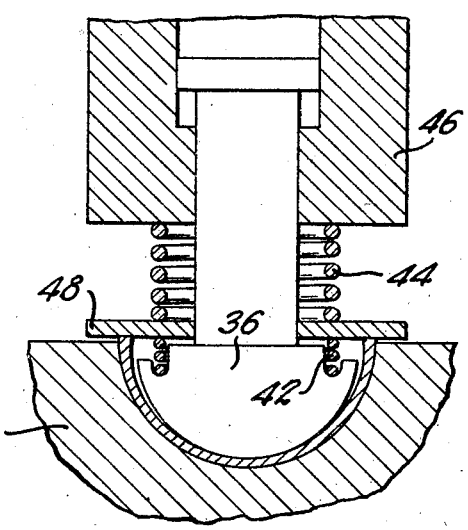

When forming bearings, the stock 18 is pressed over the cavity 40 as shown in Fig. 5 and then the plunger 36 is moved downwardly to engage the stock and thereby bend the same as shown in Fig. 6. After the plunger bottoms the stock in the cavity 40, as shown in Fig. 7, forward movement of the guiding member 46 causes a plate 48 to contact the ends of the bearings which are so designated as to protrude slightly from the die cavity 40. It will be noted that the cavity 40 has a cavity slightly greater in radius than that of the plunger 36 so that the bearing blank 18 when formed as shown in Fig. 7 does not top the walls of the cavity 40 at the end portions thereof.

Upon pressure of plate 48 against the ends of the bearing is swaged or coined so that the stock is slightly thickened at the end portions to substantially fill the space between the plunger 36 and the walls of the cavity 40. In this manner, the steel backing material is thickened at the tapering portions thereof back to the thickness of the remainder of the blank whereby upon machining of the bearing a uniform thickness of babbitt layer may be provided throughout.

Similar apparatus is used to form bearings which include the sintered metal layer with the babbitt overlay thereon.

It is preferred, that the plate 48 strike the ends of the bearings with percussive force to swage or coin the bearings to the desired thickness at the ends thereof, however it is apparent that if plate 48 is forced against these end portions, that a similar result will be obtained although the action will be smaller and in the composite type of bearing particularly this slow action is not desirable.

While the embodiment of the present invention as herein disclosed, constitutes a preferred form, it is to be understood that other forms might be adopted, all coming within the scope of the claims which follow:

What is claimed is as follows:

1. In a method of making composite bearings the steps comprising, providing a long length of steel or the like having the longitudinal edges thereof tapered a predetermined amount, babbitting said strip of material, blanking bearing blanks from said strip stock transversely thereof, forming the blanks into an arcuate shape wherein a swaging operation is simultaneously performed at the ends thereof for crowding metal to the tapered edges thereof for increasing the thickness thereof to substantially the same thickness as the remainder of the bearing, and then machining the babbitt so that the thickness of the babbitt layer is uniform thruout.

2. The steps of forming composite bearings comprising, providing long lengths of steel or the like having a sintered metal matrix thereon which is bonded thereto, sizing the matrix between pressure rolls whereby the thickness of the matrix is greater at the center of the strip than at the longitudinal edges thereof, impregnating the matrix with a soft bearing metal so that there is a substantial thickness of the bearing metal over the top of the matrix, cutting blanks from said strip by severing the strip transversely thereof, forming the blanks into arcuate bearings and simultaneously swaging the blanks at the ends thereof for crowding the matrix metal at either end thereof to cause the reduced thickness portions of the matrix to increase to substantially the thickness of the remainder of the bearing, and then machining the soft bearing metal so that an overlay of uniform thickness remains entirely over the matrix layer.

3. In a method of forming arcuate bearings comprising the steps of, tapering the edges of a bearing blank, forming the bearing blank to an arcuate shape and then while said bearing blank is being formed into an arcuate shape, striking the end portions thereof with sufficient force to cause a thickening of the metal for causing the ends to increase in thickness to substantially the thickness of the remainder of the bearing.

4. In a method of preparing composite stock including a sintered metal matrix bonded to steel for subsequent use in the formation of bearings; the steps comprising: sintering a loose, non-compacted layer of metal powder on the surface of a steel strip for forming a highly porous metal matrix thereon, compressing the matrix metal under greater pressures at the longitudinal edges thereof for causing the matrix metal to have less thickness at the edges than at the center thereof, impregnating said matrix metal with a soft bearing metal, and then forming the bearing into arcuate shape and simultaneously swaging the end portion thereof for causing the steel to thicken at the end portions and bringing the matrix layer into an arcuate shape substantially concentric with the external arc of the steel, and finally machining the babbitt to a uniform thickness throughout the bearing.

5. A method of forming arcuate bearings comprising the steps of providing a bearing blank having an appreciable taper at the two end portions thereof on one side only, forming the bearing blank into arcuate shape so that the two tapered end portions are adjacent the internal circumference thereof and simultaneously swedging the end portions sufficiently to cause the metal to flow outwardly at the ends for increasing the thickness of the ends to substantially the thickness of the remainder of the bearing and for causing the bearing to be of a true arcuate shape.

JEAN A. LIGNIAN.